United States Patent
Ma (10) Patent No.: US 10,922,193 B2
(45) Date of Patent: Feb. 16, 2021

(54) DATA BACKUP METHOD, STORAGE MEDIUM, AND TERMINAL

(71) Applicant: GUANGDONG OPPO MOBILE TELECOMMUNICATIONS CORP., LTD., Guangdong (CN)

(72) Inventor: Zhifeng Ma, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 101 days.

(21) Appl. No.: 16/328,983

(22) PCT Filed: Aug. 3, 2017

(86) PCT No.: PCT/CN2017/095906
§ 371 (c)(1),
(2) Date: Feb. 27, 2019

(87) PCT Pub. No.: WO2018/076880
PCT Pub. Date: May 3, 2018

(65) Prior Publication Data
US 2019/0196917 A1    Jun. 27, 2019

(30) Foreign Application Priority Data
Oct. 25, 2016    (CN) .......................... 201610939565.5

(51) Int. Cl.
G06F 3/06    (2006.01)
G06F 11/14    (2006.01)
H04L 29/08    (2006.01)

(52) U.S. Cl.
CPC .......... *G06F 11/1464* (2013.01); *G06F 3/067* (2013.01); *G06F 3/0614* (2013.01);
(Continued)

(58) Field of Classification Search
CPC ............. G06F 11/1451; G06F 11/1464; G06F 11/1469; G06F 11/3006; G06F 11/3414; G06F 3/0614; G06F 3/0653; G06F 3/067
See application file for complete search history.

(56) References Cited

U.S. PATENT DOCUMENTS 8,667,240 B2    3/2014  Camborde
2007/0011276 A1  1/2007  Sharma et al.
(Continued)

FOREIGN PATENT DOCUMENTS

CN    102650961    8/2012
CN    102685164    9/2012
(Continued)

OTHER PUBLICATIONS

EPO, Office Action for EP Application No. 17865454.7, dated Aug. 27, 2019.
(Continued)

*Primary Examiner* — Yong J Choe
(74) *Attorney, Agent, or Firm* — Hodgson Russ LLP (57) ABSTRACT

A data backup method is disclosed, the method including the following steps: acquiring remaining storage capacity of a cloud space (S101); collecting usage characteristic information of an application when the remaining storage capacity is less than a preset value (S102); grading the application based on the usage characteristic information so as to obtain a grade of the application (S103); and when the grade of the application is consistent with a preset grade and the data in the corresponding application is updated, backing up updated data to the cloud space (S104).

15 Claims, 3 Drawing Sheets

(52) U.S. Cl.
CPC ........ *G06F 3/0653* (2013.01); *G06F 11/1451* (2013.01); *G06F 11/1469* (2013.01); *H04L 67/1095* (2013.01)

(56) References Cited

U.S. PATENT DOCUMENTS

2009/0144341 A1    6/2009    Hauck et al.
2013/0227047 A1    8/2013    Dolce et al.

FOREIGN PATENT DOCUMENTS

| | | |
|---|---|---|
| CN | 103118087 | 5/2013 |
| CN | 103970621 | 8/2014 |
| CN | 104008028 | 8/2014 |
| CN | 104424109 | 3/2015 |
| CN | 105138422 | 12/2015 |
| CN | 105245701 | 1/2016 |
| CN | 105677517 | 6/2016 |
| CN | 106502833 | 3/2017 |

OTHER PUBLICATIONS

SIPO, Second Office Action for CN Application No. 201610939565, dated Apr. 15, 2019.
SIPO, Third Office Action for CN Application No. 201610939565, dated Jun. 25, 2019.
SIPO, First Office Action for CN Application No. 201610939565, dated Nov. 6, 2018.
WIPO, ISR for PCT/CN2017/095906, dated Nov. 7, 2017.

DATA BACKUP METHOD, STORAGE MEDIUM, AND TERMINAL

This application is a U.S. National Phase of International Application No. PCT/CN2017/095906, filed on Aug. 3, 2017, which is based on and claims priority to Chinese Patent Application No. 201610939565.5, filed on Oct. 25, 2016, the entire disclosures of which are incorporated herein by reference.

FIELD

The present disclosure relates to a communication field, and more particularly to a data backup method, a storage medium and a terminal.

BACKGROUND

With development of network technology, usage of techniques such as cloud big data, cloud backup and cloud synchronization has become more and more popular.

An integration of a conversional virtual server can be realized to some extent, having a difference from the cloud service in that a scale and a change speed of resource allocation of a platform of the conversional virtual server. The cloud service adopts a new technology to solve time-lag of the resource allocation, which can allocate calculated resources steadily in a few minutes. Instead, the conversional virtual server needs a few hours or few days to allocate the resources. Substantially, the cloud service refers to integrating hardware resources and dividing and renting the hardware resources. Compared to the conversional dedicated server, the main advantageous of the cloud service is in that, the calculated resources can be deployed dynamically, and a processing speed at peak time can be effectively solved in a case that a whole amount of the platform can accept change of the hardware resources and an application software can perform corresponding optimization according to the change of the hardware resources. However, a storage of a cloud space is limited, such that backup data is limited. When there is a large amount of backup data, the cloud space has a big storage pressure. However, if a user is required to select for each backup, it is tedious.

DISCLOSURE

Embodiments of the present disclosure provide a data backup method, storage medium and a terminal.

Embodiments of the present disclosure provide a data backup method. The method includes: acquiring remaining storage capacity of a cloud space; collecting usage characteristic information of an application when the remaining storage capacity is less than a preset value; grading the application based on the usage characteristic information of the application, to acquire a grade of the application; and backing up updated data to the cloud space when the grade of the application is consistent with a preset grade and data in the application is updated.

Embodiments of the present disclosure provide a non-transient computer-readable storage medium. The storage medium stores a plurality of instructions. The instructions are adapt to be loaded by a processor to perform the data backup method descried above.

Embodiments of the present disclosure provide a terminal. The terminal includes a processor and a memory. The processor is coupled to the memory electrically. The memory is configured to store instructions and data. The processor is configured to perform: acquiring remaining storage capacity of a cloud space; collecting usage characteristic information of an application when the remaining storage capacity is less than a preset value; grading the application based on the usage characteristic information of the application, to acquire a grade of the application; and backing up updated data to the cloud space when the grade of the application is consistent with a preset grade and data in the application is updated.

EMBODIMENTS OF THE PRESENT DISCLOSURE

Throughout the accompanying drawings, the same or similar elements or elements with the same or similar reference numbers have same or similar functions. The principle of the present disclosure will be described by taking the present disclosure being implemented in a proper calculation environment as an example. Embodiments described below are merely exemplary and used for explaining the present disclosure, and should not be understood as limitation to the present disclosure.

In the following description, embodiments of the invention with reference to symbols and steps performed by one or more computers are described, unless stated otherwise. Therefore, that these steps and operations are mentioned to be performed by a computer several times. The computer performance mentioned hereinto includes an operation performed by a computer processing unit, which processes electronic signals representative of a structured data type in the operation of a computer processing unit. This operation converts the data or maintains its position in a memory system of the computer, which can be reconfigured or otherwise ways known to the skilled person to change the operation of the computer. A data structure maintained by the data is a physical location of a data memory. The physical location of the data memory has the specific properties defined by data format. However, the above-mentioned contents only describes the principles of the invention, as it does not represent a limitation, the skilled person can aware that the various steps described below may be implemented in hardware.

Embodiments of the present disclosure provide a data backup method. The method includes: acquiring remaining storage capacity of a cloud space; collecting usage characteristic information of an application when the remaining storage capacity is less than a preset value; grading the application based on the usage characteristic information of the application, to acquire a grade of the application; and backing up updated data to the cloud space when the grade of the application is consistent with a preset grade and data in the application is updated.

In some embodiments, before backing up the updated data to the cloud space when the grade of the application is consistent with the preset grade and data in the application is updated and after grading the application based on the usage characteristic information of the application to acquire the grade of the application, the method further includes: acquiring the preset grade based on the remaining storage capacity.

In some embodiments, backing up the updated data to the cloud space when the grade of the application is consistent with the preset grade and data in the application is updated includes: acquiring a type of the updated data when the grade of the application is consistent with the preset grade and the data in the application is updated; and backing up the updated data to the cloud space when the type of the updated data is a preset type.

In some embodiments, collecting the usage characteristic information of the application when the remaining storage capacity is less than the preset value includes: collecting a clicking rate of the application within a preset time period when the remaining storage capacity is less than the preset value. Grading the application based on the usage characteristic information of the application, to acquire the grade of the application includes: grading the application based on the clicking rate of the application, to acquire the grade of the application.

In some embodiments, collecting the usage characteristic information of the application when the remaining storage capacity is less than the preset value includes: collecting a clicking rate and a running time of the application within a preset time period when the remaining storage capacity is less than the preset value. Grading the application based on the usage characteristic information of the application to acquire the grade of the application includes: acquiring type information of the application; and grading the application based on the type information, the clicking rate and the running time of the application, to acquire the grade of the application.

Embodiments of the present disclosure provide a data backup system. The data backup system mainly includes a data backup apparatus and a terminal. The data backup apparatus may be integrated in a mobile terminal such as a tablet computer, a mobile phone, etc.

Figure 1:
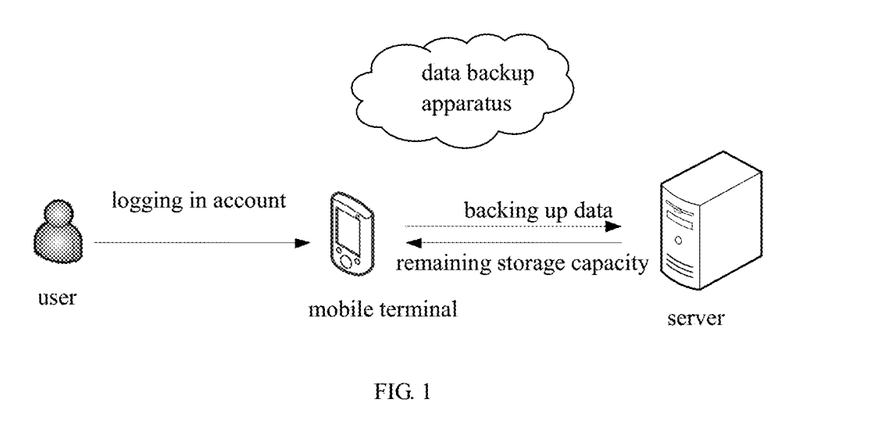
FIG. 1 is a diagram illustrating a scene of a data backup system according to an embodiment of the present disclosure.

FIG. 1 is a diagram illustrating a scene of the data backup system provided by the present disclosure. The data backup apparatus is integrated in a mobile phone. The data backup apparatus is mainly configured to acquire remaining storage capacity of a cloud space; collect usage characteristic information of an application when the remaining storage capacity is less than a preset value; grade the application based on the usage characteristic information of the application, to acquire a grade of the application; and back up updated data to the cloud space when the grade of the application is consistent with a preset grade and data in the application is updated.

In an embodiment, the present disclosure is described from the perspective of the data backup apparatus. The data backup apparatus is integrated in a terminal such as a tablet computer, a phone or the like.

Figure 2:
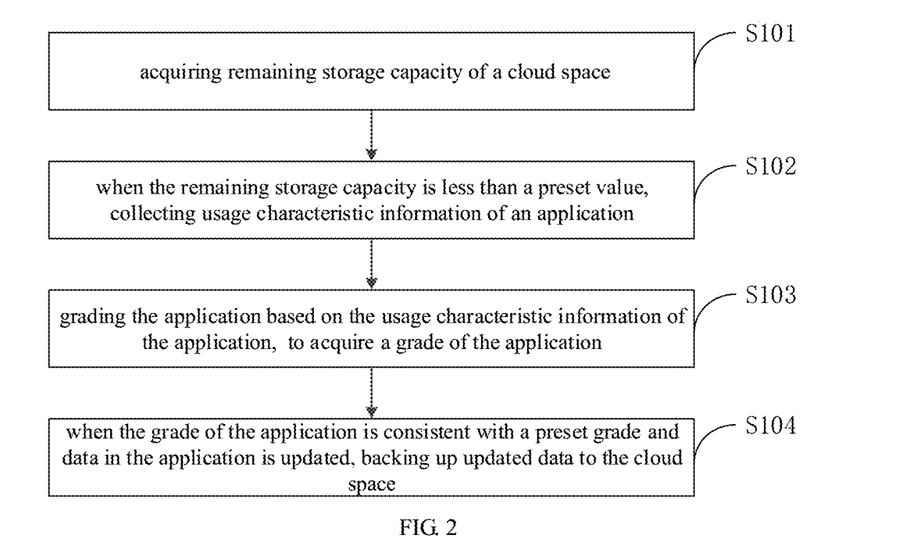
FIG. 2 illustrates a flow chart of a data backup method according to an embodiment of the present disclosure.

FIG. 2 illustrates a flow chart of a data backup method according to an embodiment of the present disclosure. The data backup method is mainly applied in a mobile terminal. The data backup method includes the followings.

At block S101, remaining storage capacity of a cloud space is acquired.

At block S102, when the remaining storage capacity is less than a preset value, usage characteristic information of an application is collected.

At block S103, the application is graded based on the usage characteristic information of the application, to acquire a grade of the application.

At block S104, when the grade of the application is consistent with a preset grade and data in the application is updated, updated data is backed up to the cloud space.

In the following, the acts of the data backup method will be described in detail.

In block S101, since a storage capacity of a cloud server is limited, the capacity of cloud space assigned to an account is limited. Once a user logs in a cloud account, a request of acquiring the remaining capacity is sent to the server, and the server sends information on the remaining capacity of the cloud space corresponding to the cloud account to the terminal.

In block S102, when an occupancy rate of the cloud space exceeds 60%, i.e., the remaining storage capacity is less than 40% of a total capacity of the cloud space, the usage characteristic information of the application in the terminal is collected. The application may be QQ, WeChat, mobile phone address book software, Alipay, mobile phone email, mobile phone bank or the like. The usage characteristic information may include one or more of a clicking rate, an access rate, a running time and the like.

In block S103, when the usage characteristic information is the clicking rate x, a plurality of applications in the terminal can be graded into Grade 1, Grade 2, Grade 3 . . . Grade N according to an order of the clicking rates from highest to lowest. In this case, the act at block S103 includes grading the application based on the clicking rate of the application, to acquire the grade of the application.

When the usage characteristic information is the clicking rate x and the running time t, the act at block S103 includes the followings.

At block S1031, type information of the application is acquired. For example, chat interactive software may be configured as type A, mobile terminal financial software may be configured as type B, music and video play software may be configured as type C.

At block S1032, the application is graded based on the type information, the clicking rate and the running time of the application, to acquire the grade of the application. When the grade of the application is set, a grade setting reference value Y is taken into account, Y=hXK, where h represents a coefficient corresponding to the type information of the application, x represents the clicking rate, k represents the running time. When the grade of the application is set, a plurality of applications are graded into Grade 1, Grade 2, Grade 3 . . . Grade N based on an order of values of Y from highest to lowest.

In block S104, assuming that the grades of the plurality of applications range from Grade 1 to Grade 3, when data of the plurality of applications corresponding to the grade range of Grade 1 to Grade 3 is updated, the updated data is backed up to the cloud space. The grade range is not limited herein, and can be configured according to actual situations.

The act at block S104 includes the followings.

At block S1041, when the grade of the application is consistent with the preset grade and data in the application is updated, a type of the updated data is acquired.

At block S1042, when the type of the updated data is a preset type, the updated data is backed up to the cloud space.

In the block S1041, the type of the updated data may include version date and interactive data of the application.

The interactive data may be interactive data between the user and the application, for example, an account, a password, information on the address book inputted manually by the user. The interactive data may further be interactive data between the application used by the user and the same kind of applications used by other users, for example, chatting records, and transfer records. The interactive data may further be interactive data between the application between network, for example, music or documents downloaded through the application.

In block S1042, when the updated data is the interactive data, the updated data is backed up to the cloud space for storage.

In the embodiment of the present disclosure, by acquiring the remaining storage capacity of the cloud space, when the remaining storage capacity is less than the preset value, collecting the usage characteristic information of an application, grading the application based on the usage characteristic information to acquire the grade of the application, when the grade of the application is consistent with the preset grade and the data in the application is updated, backing up the updated data to the cloud space, the data backup can be realized. In this embodiment, by backing up data selectively according to the usage characteristic information when the remaining storage capacity is less than the preset value, the storage pressure of the cloud space may be decreased, thus facilitating the normal backup of important data.

Figure 3:
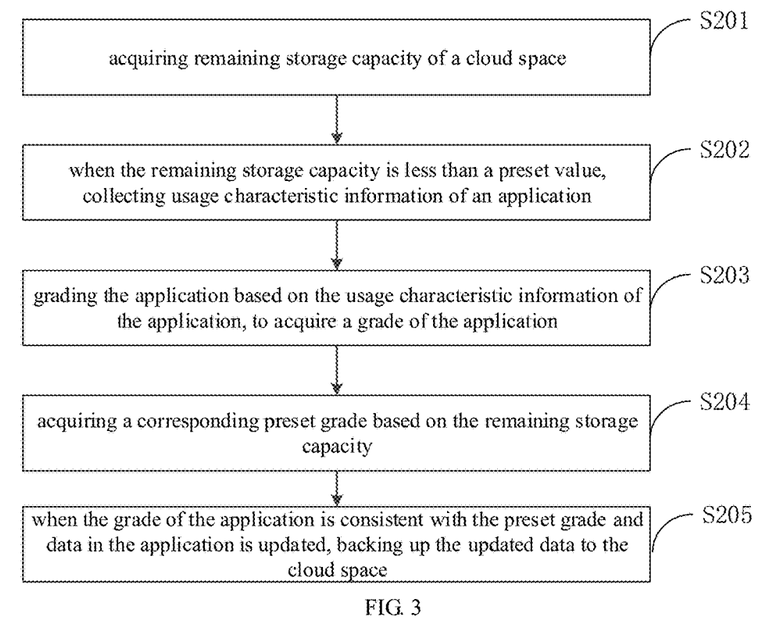
FIG. 3 illustrates a flow chart of a data backup method according to another embodiment of the present disclosure.

FIG. 3 illustrates a flow chart of a data backup method according to another embodiment of the present disclosure. The data backup data is mainly applied in a mobile terminal. The data backup method includes the followings.

At block S201, remaining storage capacity of a cloud space is acquired.

At block S202, when the remaining storage capacity is less than a preset value, usage characteristic information of an application is collected.

At block S203, the application is graded based on the usage characteristic information of the application, to acquire a grade of the application.

At block S204, a corresponding preset grade is acquired based on the remaining storage capacity.

At block S205, when the grade of an application is consistent with the preset grade and data in the application is updated, the updated data is backed up to the cloud space.

In the following, the acts of the data backup method will be described in detail.

In block S201, since a storage capacity of a cloud server is limited, the capacity of cloud space assigned to an account is limited. Once a user logs in a cloud account, a request of acquiring the remaining capacity is sent to the server, and the server sends information on the remaining capacity of the cloud space corresponding to the cloud account to the terminal.

In block S202, when an occupancy rate of the cloud space exceeds 60%, i.e., the remaining storage capacity is less than 40% of a total capacity of the cloud space, the usage characteristic information of the application in the terminal is collected. The application may be QQ, WeChat, mobile phone address book software, Alipay, mobile phone email, mobile phone bank or the like. The usage characteristic information may include one or more of a clicking rate, an access rate, a running time and the like. In some embodiments, the preset value may be set to be other values.

In block S203, when the usage characteristic information is the clicking rate x, a plurality of applications in the terminal can be graded into Grade 1, Grade 2, Grade 3 . . . Grade N based on an order of the clicking rates from highest to lowest. In this case, the act at block S203 includes grading the application based on the clicking rate of the application to acquire the grade of the application.

When the usage characteristic information is the clicking rate x and the running time t, the act at block S203 includes the followings.

At block S2031, type information of the application is acquired. For example, chat interactive software may be configured as type A, mobile terminal financial software may be configured as type B, music and video play software may be configured as type C.

At block S2032, the application is graded based on the type information, the clicking rate and the running time of the application, to acquire the grade of the application. When the grade of the application is set, a grade setting reference value Y is taken into account, Y=hXK, where h represents a coefficient corresponding to the type information of the application, x represents the clicking rate, k represents the running time. When the grades of a plurality of applications are set, the applications are graded into Grade 1, Grade 2, Grade 3 . . . Grade N based on an order of values of Y from highest to lowest.

In block S204, for example, when the remaining storage capacity falls within a range of 50%-60% of the total capacity, the preset grade is configured as Grade 1 to Grade 20. When the remaining storage capacity falls within a range of 40%-50% of the total capacity, the preset grade is configured as Grade 1 to Grade 15. When the remaining storage capacity falls within a range of 30%-40% of the total capacity, the preset grade is configured as Grade 1 to Grade 10. When the remaining storage capacity falls within a range of 20%-30% of the total capacity, the preset grade is configured as Grade 1 to Grade 5. When the remaining storage capacity less than 20% of the total capacity, the preset grade is configured as Grade 1 to Grade 2.

In block S205, when the data in the application belonging to the grade range corresponding to the remaining storage capacity is updated, the updated data is backed up to the cloud space. Of course, the grand range is not limited herein, which can be set according actual situations.

The act at block S205 includes the followings.

At block S2051, when the grade of the application is consistent with the preset grade and the data in the application is updated, a type of the updated data is acquired.

At block S2052, when the type of the updated data is a preset type, the updated data is backed up to the cloud space.

In block S2051, the type of the updated data may include version data of the application and interactive data of the application. The interactive data may be interactive data between the user and the application, for example, an account, a password, information on the address book inputted manually by the user. The interactive data may further be interactive data between the application used by the user and the same kind of applications used by other users, for example, chatting records, and transfer records. The interactive data may further be interactive data between the application between network, for example, music or documents downloaded through the application.

In block S2052, when the updated data is the interactive data, the updated data is backed up to the cloud space for storage.

In the embodiment of the present disclosure, by acquiring the remaining storage capacity of the cloud space, when the remaining storage capacity is less than the preset value, collecting the usage characteristic information of an application, grading the application based on the usage characteristic information to acquire the grade of the application, when the grade of the application is consistent with the preset grade and the data in the application is updated, backing up the updated data to the cloud space, the data backup can be realized. In this embodiment, by backing up data selectively according to the usage characteristic information when the remaining storage capacity is less than the preset value, the storage pressure of the cloud space may be decreased, thus facilitating the normal backup of important data.

Embodiments of the present disclosure further provide a data backup apparatus. The data backup apparatus includes a first acquiring module, a collecting module, a setting module, and a backup module.

The first acquiring module is configured to acquire remaining storage capacity of a cloud space.

The collecting module is configured to collect usage characteristic information of an application when the remaining storage capacity is less than a preset value.

The setting module is configured to grade the application based on the usage characteristic information of the application, to acquire a grade of the application.

The backup module is configured to back up updated data to the cloud space when the grade of the application is consistent with a preset grade and data in the application is updated.

In some embodiments, the data backup apparatus further includes: a second acquiring module.

The second acquiring module is configured to acquire the preset grade according to the remaining storage capacity.

In some embodiments, the backup module includes an acquiring unit, and a backup unit.

The acquiring unit is configured to acquire a type of the updated data when the grade of the application is consistent with the preset grade and data in the application is updated.

The backup unit is configured to back up the updated data to the cloud space when the type of the updated data is a preset type.

In some embodiments, the backup module includes an acquiring unit, and a backup unit.

The acquiring unit is configured to acquire a type of the updated data when the grade of the application is consistent with the preset grade and data in the application is updated.

The backup unit is configured to back up the updated data to the cloud space when the type of the updated data is a preset type.

In some embodiments, the collecting module is configured to collect a clicking rate of the application within a preset time period when the remaining storage capacity is less than the preset value. The setting module is configured to grade the application based on the clicking rate of the application, to acquire the grade of the application.

In some embodiments, the collecting module is configured to collect a clicking rate and a running time of the application within a preset time period when the remaining storage capacity is less than the preset value. The setting module is configured to acquire type information of the application, and to grade the application based on the type information, the clicking rate and the running time of the application, to acquire the grade of the application.

Figure 4:
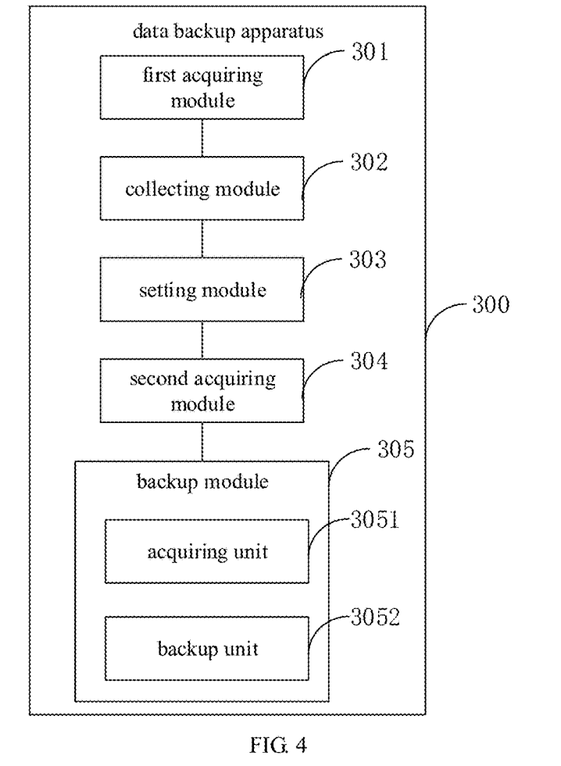
FIG. 4 illustrates a block diagram of a data backup apparatus according to an embodiment of the present disclosure.

FIG. 4 illustrates a block diagram of a data backup apparatus according to an embodiment of the present disclosure. The data backup apparatus is mainly applied in a mobile terminal. The data backup apparatus includes a first acquiring module 301, a collecting module 302, a setting module 303, a second acquiring module 304 and a backup module 305.

The first acquiring module 301 is configured to acquire remaining storage capacity of a cloud space.

The collecting module 302 is configured to collect usage characteristic information of an application when the remaining storage capacity is less than a preset value.

The setting module 303 is configured to grade the application based on the usage characteristic information of the application, to acquire a grade of the application.

The second acquiring module 304 is configured to acquire a preset grade according to the remaining storage capacity.

The backup module 305 is configured to back up updated data to the cloud space when the grade of the application is consistent with a preset grade and data in the application is updated. In detail, the backup module 305 includes an acquiring unit 3051 and a backup unit 3052. The acquiring unit 3051 is configured to acquire a type of the updated data when the grade of the application is consistent with the preset grade and data in the application is updated. The backup unit 3052 is configured to back up the updated data to the cloud space when the type of the updated data is a preset type.

The collecting module 302 is configured to collect a clicking rate of the application within a preset time period when the remaining storage capacity is less than the preset value. Correspondingly, the setting module 303 is configured to grade the application based on the clicking rate of the application, to acquire the grade of the application.

The collecting module 302 is configured to collect a clicking rate and a running time of the application within a preset time period when the remaining storage capacity is less than the preset value. Correspondingly, the setting module 303 is configured to acquire type information of the application, and to grade the application based on the type information, the clicking rate and the running time of the application, to acquire the grade of the application.

In the embodiment of the present disclosure, the first acquiring module is configured to acquire the remaining storage capacity of the cloud space. The collecting module is configured to collect usage characteristic information of an application when the remaining storage capacity is less than a preset value. The setting module is configured to grade the application based on the usage characteristic information of the application, to acquire a grade of the application. The backup module is configured to back up updated data to the cloud space when the grade of the application is consistent with a preset grade and data in the application is updated. In this way, the data backup can be realized. In this embodiment, by backing up data selectively according to the usage characteristic information of the application when the remaining storage capacity is less than the preset value, the storage pressure of the cloud space may be decreased, thus facilitating the normal backup of important data.

Figure 5:
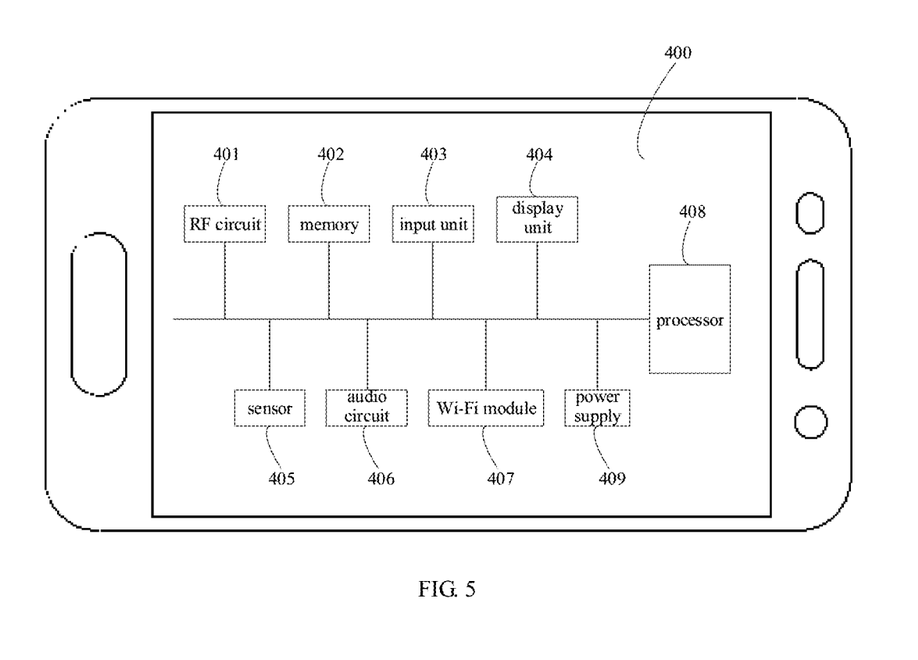
FIG. 5 illustrates a block diagram of a terminal according to an embodiment of the present disclosure.

As illustrated in FIG. 5, embodiments of the present disclosure further provide a terminal 400. The terminal 400 may include a radio frequency (RF) circuit 401, a memory 402 including one or more computer-readable storage mediums, an input unit 403, a display unit 404, a sensor 405, an audio circuit 406, a wireless fidelity (Wi-Fi) module 407, a processor 408 including one or more processing cores, a power supply 409 and other components. It will be understood by those skilled in the art that the structure of the terminal illustrated in FIG. 5 does not constitute a limitation to the terminal, and may include more or less components than those illustrated, or some components may be combined, or the components may be arranged differently.

The RF circuit 401 may be configured to receive and transmit signals during a process of transmitting and receiving a message or making a call. The RF circuit 401 may be configured to receive downlink data from a base station and to transmit the downlink data to one or more processors 408. Alternatively, the RF circuit 401 may be configured to transmit uplink data to the base station. In general, the RF circuit 401 includes but is not limited to an antenna, at least one amplifier, a turner, one or more oscillators, a subscriber identity module (SIM) card, a transceiver, a coupler, a low noise amplifier (LNA), a diplexer and the like. Furthermore, the RF circuit 401 may be further configured to communicate with other devices via wireless communication and network. The above wireless communication may adopt any communication standard or protocol, which includes but is not limited to global system of mobile communication (GSM), general packet radio service (GPRS), code division multiple access (CDMA), wideband code division multiple access (WCDMA), long term evolution (LTE), e-mail, short messaging service (SMS) and the like.

The memory 402 may be configured to store software programs or modules. The processor 408 is configured to execute various functional applications and data processes of the mobile phone by running the software programs and modules stored in the memory 402. The memory 402 may mainly include a program storage region and a data storage region. The program storage region may store an operating system, at least one function required application (such as an application having a sound playing function, an application having an image playing function) and the like. The data storage region may store data produced by using the mobile phone (such as audio data, an address book) and the like. In addition, the memory 402 may include a high speed random access memory and may include a non-volatility memory, such as at least one disk memory, a flash memory, or other volatility solid state memory. Accordingly, the memory 402 may further include a memory controller providing access to the memory 402 for the processor 408 and the input unit 403.

The input unit 403 may be configured to receive figure or character information inputted and generate a key signal input, a mouse signal input, an operating level signal input, an optical signal input or a trackball signal input related to a user setup or function control. In detail, the input unit 403 may include a touch panel and other input devices. The touch panel (also called as touch screen or touchpad) may be configured to gather touch operations near or on the touch panel (such as an operation on the touch panel or near the touch panel of the user with a finger, a stylus or other suitable objects or attachments), and drive corresponding coupled device according to a preset program. In an embodiment, the touch panel may include a touch detection device and a touch controller. The touch detection device detects an orientation of the user's touch, detects a signal caused by the touch operation and sends the signal to the touch controller. The touch controller receives the touch information from the touch detection device, converts the touch information to touch point coordinates, and sends the touch point coordinates to the processor 408. Furthermore, the touch controller may receive and execute a command sent from the processor 408. The touch panel may be implemented as a resistive type, a capacitive type, an infrared type and a surface acoustic wave type touch panel. In addition to the touch panel, the input unit 403 may further include other input devices. In detail, the other input devices may include but are not limited to one or more of a physical keyboard, a functional key (such as a volume control key, a switch key and the like), a trackball, a mouse, an operating level.

The display unit 404 may be configured to display information inputted by the user or information provided to the user, and various graphic user interfaces of the terminal. The graphic user interfaces may be formed by graphic, text, icons, videos or any combination thereof. The display unit 404 may include a display panel. In an embodiment, the display panel may be configured as a liquid crystal display (LCD), an organic light-emitting diode (OLED) and the like. In an embodiment, the touch panel may cover the display panel. When the touch panel detects the touch operation on the touch panel or near the touch panel, the touch operation is transmitted to the processor 408 to determine a type of the touch event. Thereafter, the processor 408 provides a corresponding visual output on the display panel according to the type of the touch event. Although the touch panel and the display panel are two separate components in FIG. 5 to realize an input and output function of the terminal, in certain embodiments, the touch panel and the display panel may be integrated to realize the input and output function of the terminal.

The terminal may further include at least one sensor 405, such as an optical sensor, a motion sensor and other sensors. In detail, the optical sensor may include a surrounding light sensor and a proximity sensor. The surrounding light sensor may adjust a brightness of the display panel according to surrounding lights. The proximity sensor may close the display panel and/or backlight when the mobile phone moves near ears of the user. The motion sensor may include an acceleration sensor. By the acceleration sensor, the acceleration values in various directions (typically three-axis) can be measured, and a magnitude and a direction of gravity can be measured when the terminal is static. The acceleration sensor can be used in identifying a posture of the mobile phone (such as landscape/portrait screen switching), vibration recognition related functions (such as a pedometer, a knocking) and the like. Furthermore, the terminal may be configured with a gyroscope, a barometer, a hygrometer, a thermometer, an infrared sensor and other sensors, which is not described herein.

The audio circuit 406, a loudspeaker and a microphone may provide an audio interface between the user and the mobile phone. The audio circuit 406 may receive audio data, convert the audio data to an electrical signal, and transmit the electrical signal to the loudspeaker. The loudspeaker converts the electrical signal to a sound signal and output the sound signal. In another aspect, the microphone may convert gathered sound signals to electrical signals. The audio circuit 406 receives and converts the electrical signals to audio data and outputs the audio data to the processor 408 for processing. The audio data processed by the processor 408 may be transmitted to another mobile phone via the RF circuit 401 or may be stored in the memory 402 for further processing. The audio circuit 406 may further includes an earplug jack for providing communication between a peripheral earphone and the terminal.

Wi-Fi is a short distance wireless communication technology. The terminal may help the user to receive or send an e-mail, browse webpages, access to stream medium via the Wi-Fi module 407. The Wi-Fi module 407 provides wireless broadband Internet access service to the user. Although the Wi-Fi module 407 is illustrated in FIG. 5, it may be understood that, the Wi-Fi module 407 is not essential for the terminal, thus it may be omitted according to demands without changing the nature of the present disclosure.

The processor 408 is a control center of the terminal, which utilizes various interfaces and wires to couple various parts of the terminal. By running or executing the software program and/or modules stored in the memory 402, and by invoking data stored in the memory 402, the various functions and data processing functions may be executed, thus integrally monitoring the terminal. In an embodiment, the processor 408 may include one or more processing cores. In an embodiment, the processor 408 may be integrated with an application processor and a modem processor. The application processor mainly processes the operating system, a user interface and an application. The modem processor mainly processes wireless communication. It may be understood that, the above modem processor may be not integrated in the processor 408.

The terminal may further include a power supply 409 (such as a battery) for providing power to various components of the terminal. Preferably, the power supply may be logically coupled to the processor 408 via a power management system, thereby managing charging, discharging and power consumption via the power management system. The power supply 409 may include one or more direct-current or alternating-current power supplies, a rechargeable system, a power supply fault detection circuit, a power converter or inverter, a power supply state indicator or other components.

Although not illustrated, the terminal may further include a camera, a Bluetooth module and the like, which is not described herein. In an embodiment, the processor 408 in the terminal may load executable documents corresponding to processes of one or more applications into the memory 402 according to instructions, such that the processor 408 executes the application stored in the memory 402 to perform: acquiring remaining storage capacity of a cloud space; collecting usage characteristic information of an application when the remaining storage capacity is less than a preset value; grading the application based on the usage characteristic information of the application, to acquire a grade of the application; and backing up updated data to the cloud space when the grade of the application is consistent with a preset grade and data in the application is updated.

In some embodiments, the processor is further configured to perform: acquiring the preset grade according to the remaining storage capacity.

In some embodiments, when the grade of the application is consistent with the preset grade and data in the application is updated, backing up the updated data to the cloud space, the processor is configured to perform: acquiring a type of the updated data when the grade of the application is consistent with the preset grade and the data in the application is updated; and backing up the updated data to the cloud space when the type of the updated data is a preset type.

In some embodiments, when the remaining storage capacity is less than the preset value, collecting the usage characteristic information of the application, the processor is configured to perform: collecting a clicking rate of the application within a preset time period when the remaining storage capacity is less than the preset value. When grading the application based on the usage characteristic information of the application, to acquire the grade of the application, the processor is configured to perform: grading the application based on the clicking rate of the application, to acquire the grade of the application.

In some embodiments, when the remaining storage capacity is less than the preset value, collecting the usage characteristic information of the application, the processor is configured to perform: collecting a clicking rate and a running time of the application within a preset time period when the remaining storage capacity is less than the preset value. When grading the application based on the usage characteristic information of the application to acquire the grade of the application, the processor is configured to perform: acquiring type information of the application; and grading the application based on the type information, the clicking rate and the running time of the application, to acquire the grade of the application.

Embodiments of the present disclosure provide various operations. In an embodiment, one or more operations may form computer-readable instructions stored on one or more computer-readable medium. When the computer-readable instructions are executed by an electronic device, the electronic device is caused to perform the one or more operations. An order of some or all of the operations described herein should not be explained to indicate that these operations are related in sequence. It should be understood by those skilled in the art that, other alternative orders having advantages of the specification can be implemented. It should be understood that, it is unnecessary to implement all the operations in each embodiment of the present disclosure.

The term "preferable" used herein refers to an embodiment, an example or an instance. The "preferable" aspects or designs described in the specification should not be understood to be more advantageous than other aspects or designs. Instead, the term "preferable" is used to propose a concept in a specific way. Throughout the present disclosure, the term "or" used herein refers to inclusive "or" rather than exclusive "or". In the specification, unless specified or limited otherwise, "X uses A or B" refers to any one of arrangements. If X uses A, X uses B or X uses A and B, then "X uses A or B" can be satisfied in any of the embodiments.

Further, although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. Thus, the protection scope of the present disclosure shall be limited by the protection scope of the claims. In particular, regarding the various functions are executed by the above components (for example, elements, resources or the like), the terms for describing such components correspond to any components for executing specific functions (for example, the functions are equivalent) of the above components (unless specified or limited otherwise), even though they may have different structures from those configured for implementing the functions described in the embodiments of the present disclosure. In addition, although specific technical features of the present disclosure have been disclosed in terms of some implementations, those technical features may be combined with one or more other features desired for given or specific applications or beneficial to other implementations. Further, when used in the specification, terms "comprising", "containing" and/or other modifications can be used in specific implementation or claims, these terms aims to indicate inclusion similar as the term "comprising".

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure. When the integrated module is realized in a form of software function module and is sold or used as a standalone product, the integrated module may be stored in a computer readable storage medium. The storage medium mentioned above may be read-only memories, magnetic disks, CD, etc. The aforementioned apparatus or system can perform the method described in the method embodiments.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. Thus, the protection scope of the present disclosure shall be limited by the protection scope of the claims.

What is claimed is:

1. A data backup method, comprising:
acquiring remaining storage capacity of a cloud space;
collecting usage characteristic information of an application when the remaining storage capacity is less than a preset value;
grading the application based on the usage characteristic information of the application, to acquire a grade of the application; and
backing up updated data to the cloud space when the grade of the application is consistent with a preset grade and data in the application is updated;
wherein collecting the usage characteristic information of the application when the remaining storage capacity is less than the preset value comprises: collecting a clicking rate of the application within a preset time period when the remaining storage capacity is less than the preset value; grading the application based on the usage characteristic information of the application, to acquire the grade of the application comprises: grading the application based on the clicking rate of the application, to acquire the grade of the application.

2. The method of claim 1, further comprising:
acquiring the preset grade based on the remaining storage capacity.

3. The method of claim 1, wherein backing up the updated data to the cloud space when the grade of the application is consistent with the preset grade and data in the application is updated comprises:
acquiring a type of the updated data when the grade of the application is consistent with the preset grade and the data in the application is updated; and
backing up the updated data to the cloud space when the type of the updated data is a preset type.

4. The method of claim 3, wherein the type of the updated data comprises version data of the application and interactive data of the application.

5. The method of claim 4, wherein the interactive data of the application comprises: interactive data between a user and the application and interactive data between the application with other applications used by other users.

6. The method of claim 1, wherein,
collecting the usage characteristic information of the application when the remaining storage capacity is less than the preset value further comprises: collecting a running time of the application within a preset time period when the remaining storage capacity is less than the preset value;
grading the application based on the usage characteristic information of the application further comprises: acquiring type information of the application; and grading the application based on the type information, the clicking rate and the running time of the application, to acquire the grade of the application.

7. The method of claim 1, wherein acquiring remaining storage capacity of the cloud space comprises:
sending a request for acquiring the remaining storage capacity when a cloud account is logged in; and
receiving the remaining storage capacity of the cloud space corresponding to the cloud account from the server.

8. A non-transient computer-readable storage medium, having a plurality of instructions stored therein, wherein the plurality of instructions are adapt to be loaded by a processor to perform the data backup method comprising:
acquiring remaining storage capacity of a cloud space;
collecting usage characteristic information of an application when the remaining storage capacity is less than a preset value;
grading the application based on the usage characteristic information of the application, to acquire a grade of the application; and
backing up updated data to the cloud space when the grade of the application is consistent with a preset grade and data in the application is updated;
wherein collecting the usage characteristic information of the application when the remaining storage capacity is less than the preset value comprises: collecting a clicking rate of the application within a preset time period when the remaining storage capacity is less than the preset value; grading the application based on the usage characteristic information of the application, to acquire the grade of the application comprises: grading the application based on the clicking rate of the application, to acquire the grade of the application.

9. A terminal, comprising a processor and a memory, wherein the processor is coupled to the memory electrically, the memory is configured to store instructions and data, the processor is configured to perform:
acquiring remaining storage capacity of a cloud space;
collecting usage characteristic information of an application when the remaining storage capacity is less than a preset value;
grading the application based on the usage characteristic information of the application, to acquire a grade of the application; and
backing up updated data to the cloud space when the grade of the application is consistent with a preset grade and data in the application is updated;
wherein collecting the usage characteristic information of the application when the remaining storage capacity is less than the preset value comprises: collecting a clicking rate of the application within a preset time period when the remaining storage capacity is less than the preset value; grading the application based on the usage characteristic information of the application, to acquire the grade of the application comprises: grading the application based on the clicking rate of the application, to acquire the grade of the application.

10. The terminal of claim 9, wherein the processor is further configured to perform:
acquiring the preset grade based on the remaining storage capacity.

11. The terminal of claim 9, wherein backing up the updated data to the cloud space when the grade of the application is consistent with the preset grade and data in the application is updated comprises:
acquiring a type of the updated data when the grade of the application is consistent with the preset grade and the data in the application is updated; and
backing up the updated data to the cloud space when the type of the updated data is a preset type.

12. The terminal of claim 11, wherein the type of the updated data comprises version data of the application and interactive data of the application.

13. The terminal of claim 12, wherein the interactive data of the application comprises: interactive data between a user and the application and interactive data between the application with other applications used by other users.

14. The terminal of claim 9, wherein,
collecting the usage characteristic information of the application when the remaining storage capacity is less than the preset value further comprises: collecting a running time of the application within a preset time period when the remaining storage capacity is less than the preset value;
grading the application based on the usage characteristic information of the application, to acquire the grade of the application further comprises: acquiring type information of the application; and grading the application based on the type information, the clicking rate and the running time of the application, to acquire the grade of the application.

15. The terminal of claim 9, wherein acquiring remaining storage capacity of the cloud space comprises:
sending a request for acquiring the remaining storage capacity when a cloud account is logged in; and
receiving the remaining storage capacity of the cloud space corresponding to the cloud account from the server.

* * * * *